US007413693B2

(12) United States Patent
Goacher, Sr.

(10) Patent No.: US 7,413,693 B2
(45) Date of Patent: Aug. 19, 2008

(54) WIRE CONNECTOR FASTENING TOOL

(75) Inventor: Darrell D. Goacher, Sr., Mt. Olive, IL (US)

(73) Assignee: D & G Tools LLC, Glen Carbon, IL (US)

( * ) Notice: Subject to any disclaimer, the term of this patent is extended or adjusted under 35 U.S.C. 154(b) by 803 days.

(21) Appl. No.: 10/912,382

(22) Filed: Aug. 5, 2004

(65) Prior Publication Data

US 2005/0005441 A1 Jan. 13, 2005

Related U.S. Application Data

(62) Division of application No. 09/933,329, filed on Aug. 20, 2001, now abandoned.

(51) Int. Cl.
*B29C 47/00* (2006.01)
*B25B 13/06* (2006.01)
*B25B 13/48* (2006.01)

(52) U.S. Cl. ..................... 264/148; 81/121.1; 81/124.2; 81/124.4; 81/125.1; 81/176.2

(58) Field of Classification Search ................ 81/121.1, 81/124.2, 124.4, 125.1, 176.2, 451; 260/42.56, 260/42.57; 264/148
See application file for complete search history.

(56) References Cited

U.S. PATENT DOCUMENTS 1,336,794 A 4/1920 Stepanian
3,769,862 A 11/1973 Miller
3,787,948 A 1/1974 Runge
4,012,348 A * 3/1977 Chelland et al. ............ 524/427
4,461,194 A * 7/1984 Moore ......................... 81/436
4,823,650 A 4/1989 Tuttle
4,825,732 A 5/1989 Arnold
4,860,618 A 8/1989 Givot
4,993,289 A 2/1991 Parks (Continued)

*Primary Examiner*—Dah-Wei Yuan
*Assistant Examiner*—Christopher S Nichols
(74) *Attorney, Agent, or Firm*—Thompson Coburn LLP

(57) ABSTRACT

A wire connector fastening tool comprises an elongate body having a first end, a second end, an outer hand-engaging surface and an interior surface. The outer hand-engaging surface has a generally uniform outside diameter from its first end to its second end. The interior surface defines an internal axial bore extending through the body from the first end to the second end. The axial bore has a first section with a first inside diameter and a second section with a second inside diameter. The second inside diameter is larger than the first inside diameter. The first section of the bore extends from the first end of the body to a point between the first and second ends of the body. The second section of the bore extends from the first section of the bore to the second end of the body. The first end of the body is adapted to engage with at least a portion of the first wire connector in a manner so that rotation of the body causes rotation of the first wire connector. The second end of the body is adapted to engage with at least a portion of a larger second wire connector in a manner so that rotation of the body causes rotation of the second wire connector. The internal axial bore is adapted to receive a pigtail or extension wire that extends beyond other electrical wires received in the wire connector. The pigtails and extension wires may be used for device terminations, and may be used as extensions for connecting the circuit to other circuits or electrical devices.

17 Claims, 2 Drawing Sheets

U.S. PATENT DOCUMENTS 5,309,799 A * 5/1994 Jore .......................... 81/451
5,379,809 A 1/1995 Waulk
5,542,321 A 8/1996 Fuca
5,887,631 A 3/1999 Eaton
5,974,916 A 11/1999 Lassiter
5,996,447 A * 12/1999 Bayouth .................. 81/176.2
6,053,078 A 4/2000 Parker et al.
D431,984 S 10/2000 Cotillon
6,198,049 B1 3/2001 Korinek
6,257,099 B1 7/2001 Rosenbaum
6,269,717 B1 * 8/2001 Bollinger .................. 81/177.2
6,314,841 B1 * 11/2001 Burk et al. ................ 81/125.1
6,354,176 B1 3/2002 Nordlin

* cited by examiner

WIRE CONNECTOR FASTENING TOOL

This is a divisional patent application from patent application Ser. No. 09/933,329, filed Aug. 20, 2001 now abandoned.

BACKGROUND OF THE INVENTION

The present invention relates to wire connector fastening tools and drivers. More particularly, the present invention relates to tools used for attaching a wire connector to a plurality of electrical wires for electrically connecting conductive ends of the electrical wires to one another. Even more particularly, the present invention relates to a wire connector fastening tool that is easy to manufacture and use, and which is capable of receiving a variety of sizes and shapes of wire connectors.

Wire connectors are used to electrically connect exposed conductive ends of two or more electrical wires together. In recent years, the use of such wire connectors has become very popular in the installation of lighting fixtures, ceiling fans, electrical switches and electrical outlets, because they are relatively inexpensive and easier to use than prior art methods of connecting electrical wires, such as soldering.

In general, conventional wire connectors comprise an outer cap portion of non-conductive material (e.g., plastic) and a tapered insert of conductive material (e.g., metal) carried within the cap. The cap is provided with an open lower end that permits access to the conductive insert. Typically, the insert includes an internally threaded socket adapted to receive the exposed conductive ends of two or more electrical wires that are to be conductively connected. In use, the exposed conductive ends of two or more electrical wires are aligned with one another and inserted into the open end of the wire connector. The user then uses his or her fingers to manually twist or screw the wire connector onto the ends of the wires until the internally threaded socket of the conductive metal insert tightly engages the conductive ends of the wires to conductively connect them to one another and to secure the wire connector to the wires. The non-conductive cap of the wire connector insulates the exposed portions of the connected electrical wires from contacting other wires or other conductive portions of the fixture. In many conventional wire connectors, the upper end of the wire connector includes an aperture that is adapted to receive a wire pigtail or other wire extension (e.g., a ground wire, a hot leg, or a neutral conductor) that is to be passed through the upper end of the cap.

Such conventional wire connectors come in a variety of shapes and sizes. One type of conventional wire connector has a generally conical or frustoconical shape with a ribbed outer surface that facilitates manual twisting or screwing of the wire connector. See FIG. 5, which is discussed more fully below. Another type of conventional wire connector has a generally tapered body portion with a pair of outwardly extending "wings" or fins disposed on opposite sides of the body portion to make it easier for the user to manually twist or screw the wire connector onto the ends of the wires.

A problem with manually twisting or screwing conventional wire connectors onto wires is that the user's fingers and thumb can become sore from engagement with the ribs and wings of the nuts, particularly after installing a large number of them. To avoid this problem, various prior art wrenches, pliers and other tools have been developed for installing wire connectors. However, these prior art devices have proven to be heavy and cumbersome, difficult to use, or altogether ineffective. Thus, a need exists for a wire connector fastening tool that facilitates manual installation of wire connectors, yet is lighter, more compact and easier to use than prior art tools.

Another problem with prior art wire connector fastening tools is that they do not provide an effective means for receiving a wire pigtail or other wire extension (e.g., a ground wire, a hot leg, or a neutral conductor) that passes through the upper end of the cap or for receiving a ready made pigtail attached to the wire connector itself. Thus, a need exists for a wire connector fastening tool that does provide a means for receiving a wire pigtail or other wire extension extending from the top of the wire connector.

SUMMARY OF THE INVENTION

A general object of the invention is to provide a wire connector fastening tool that is simple in construction and inexpensive to manufacture, yet capable of receiving a variety of sizes and shapes of wire connectors. Another object of the invention is to provide a wire connector fastening tool that is easier to use than prior art wire connector fastening tools and drivers. Still another object of the invention is to provide a wire connector fastening tool that is made entirely of nonconductive materials and that is sized to fit easily on one's pocket when not in use. A more specific object of the invention is to provide a wire connector fastening tool having an axial passageway that is shaped and adapted to receive and isolate a wire pigtail or other wire extension (e.g., a ground wire, a hot leg, or a neutral conductor) that is to be passed through the upper end of the cap of the wire connector.

In general, a wire connector fastening tool of the present invention comprises an elongate body having a first end, a second end, and an outer hand-engaging surface. The outer surface has a generally uniform outside diameter from the first end of the body to the second end of the body. The body comprises first and second sections having first and second axial bores, respectively. The first axial bore has a first inside diameter that extends from the first end of the body to a point between the first and second ends of the body. The second axial bore has a second inside diameter that is larger than the first inside diameter. The second axial bore extends from the first axial bore to the second end of the body. The first and second axial bores are in communication with one another to define an internal passage that extends through the body from the first end to the second end. The first end of the body is adapted to receive a portion of the wire connector with an outside diameter less than or equal to the first inside diameter. The second end of the body is adapted to receive a portion of a wire connector with an outside diameter of less than or equal to the second inside diameter.

In another aspect of the invention, a wire connector fastening tool comprises an elongate body having a first end, a second end, an outer hand-engaging surface, and an interior surface. The outer hand-engaging surface has a generally uniform outside diameter from the first end of the body to the second end of the body. The interior surface of the body defines an internal axial bore, which extends through the body from the first end to the second end. The axial bore has a first section with a first inside diameter and a second section with a second inside diameter. The second inside diameter is larger than the first inside diameter. The first section of the bore extends from the first end of the body to a point between the first and second ends of the body. The second section of the bore extends from the first section of the bore to the second end of the body. The first end of the body is adapted to engage with at least a portion of a first wire connector in a manner so that rotation of the body causes rotation of the first wire connector. The second end of the body is adapted to engage with at least a portion of a larger second wire connector in a manner so that rotation of the body causes rotation of the second wire connector.

In general, a method of making a wire connector fastening tool of the present invention comprises the steps of: providing an elongate monolithic body having a first end, a second end, and an outer surface; forming a first internal axial bore within the body; forming a second internal axial bore within the body; forming at least two notches in the first end of the body; and forming at least two notches in the second end of the body. The step of providing an elongate monolithic body includes providing a body with an outer surface that has an outside diameter that is generally uniform between the first and second ends of the body. The step of forming the first internal axial bore includes forming the bore with a first inside diameter that extends from the first end of the body to a point between the first and second ends of the body. The step of forming the second internal axial bore includes forming the bore with a second inside diameter that extends from the second end of the body to the first axial bore so that the first and second axial bores define an internal passage that extends axially through the body. The second inside diameter is larger than the first inside diameter. The step of forming at least two notches in the first end of the body includes forming notches that extend radially outwardly from the first axial bore toward the outer surface of the body and that open axially outwardly from the first end of the body. The step of forming at least two notches in the second end of the body include forming notches that extend radially outwardly from the second axial bore toward the outer surface of the body and that open axially outwardly from the second end of the body.

A method of using a wire connector fastening tool of the present invention to connect a plurality of wires to one another comprises the steps of: providing a wire connector fastening tool with an elongate body; providing a wire connector; inserting the wire connector into either a first end or a second end of the body in a manner so that at least an upper portion of the wire connector is received within an internal axial bore of the body; inserting conductive ends of electrical wires to be connected into a wire-connecting socket of the wire connector; passing a wire extension through an aperture in the upper end of the wire connector; inserting the wire extension into the axial bore of the elongate body; and turning the elongate body to secure the wire connector to the conductive ends of the electrical wires inserted therein, thereby electrically connecting the electrical wires to one another.

While the principal advantages and features of the present invention have been described above, a more complete and thorough understanding and appreciation of the invention may be attained by referring to the drawings and detailed description of the preferred embodiments, which follow.

Figure 1:
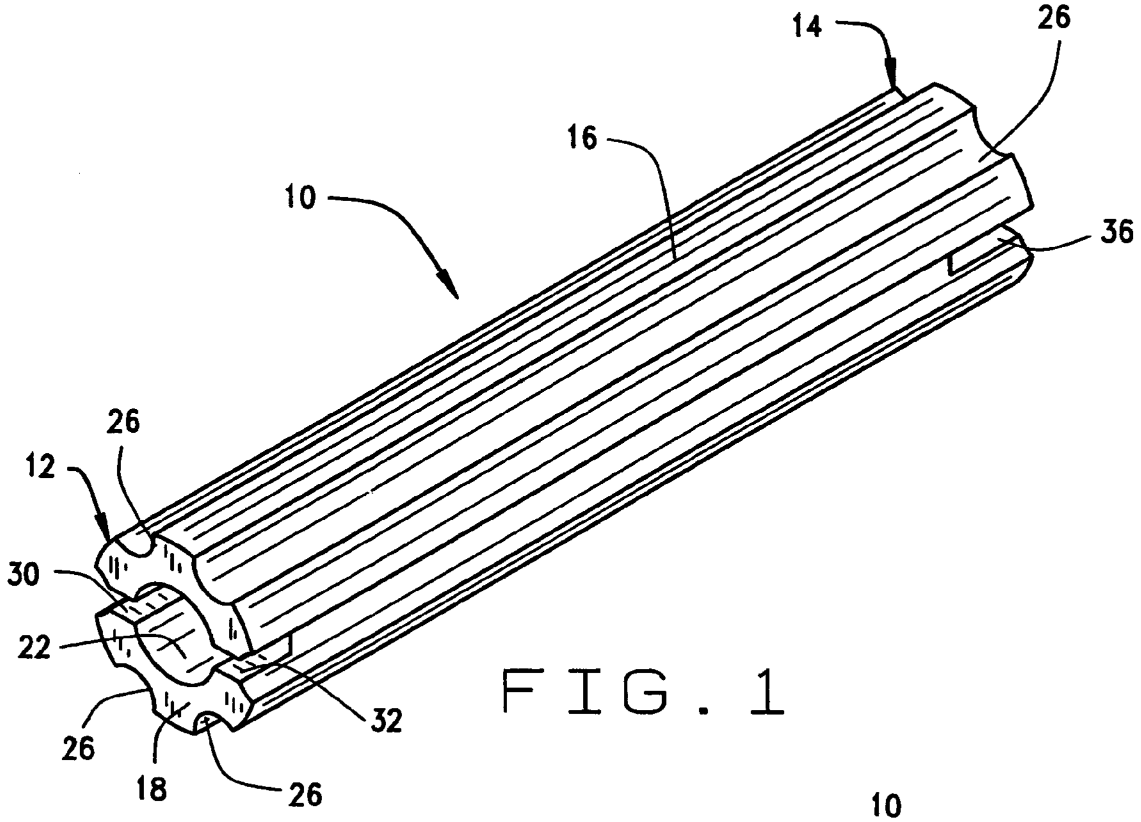
FIG. 1 is a perspective view of a wire connector fastening tool of the present invention.

Reference characters in these Figures correspond to reference characters in the following detailed description of the preferred embodiments.

DETAILED DESCRIPTION OF THE PREFERRED EMBODIMENT

Figure 2:
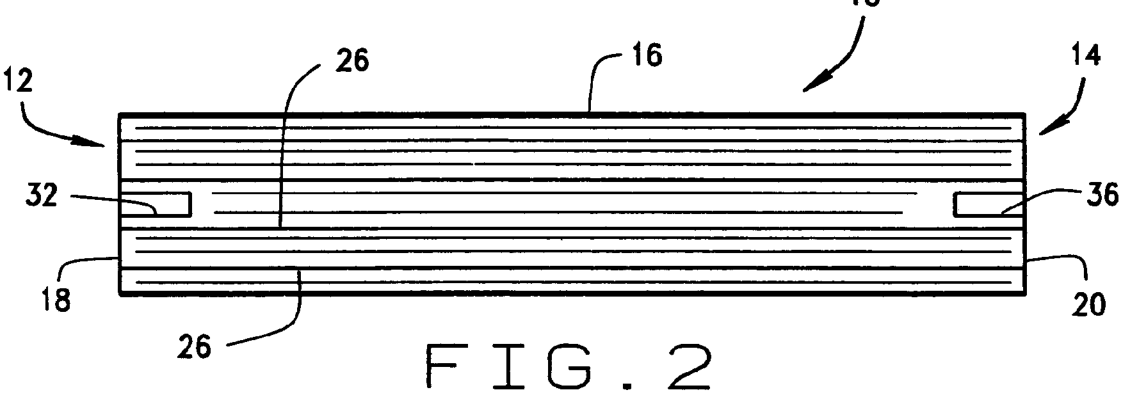
FIG. 2 is a side elevational view of the tool of FIG. 1.
Figure 3:
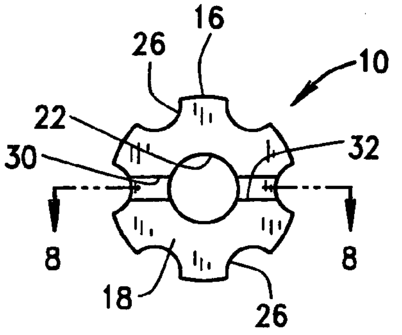
FIG. 3 is a left end elevational view of the tool of FIG. 1.

A wire connector fastening tool of the present invention is represented generally in the Figures by the reference numeral 10. In general, the wire connector fastening tool 10 comprises an elongate body having a first end 14, a second end 16, an outer hand-engaging surface 16 and an interior surface 22 that defines an internal axial bore extending through the body from the first end 14 to the second end 16. As shown in FIGS. 1 and 2, the outer hand-engaging surface 16 is preferably generally cylindrical and has a generally uniform outside diameter along its entire length from the first end 14 to the second end 16. As best shown in FIGS. 1-3, the first end 14 of the body includes a generally planar first end surface 18. Similarly, as best shown in FIGS. 2 and 4, the second first end 16 of the body includes a generally planar second end surface 20.

Figure 4:
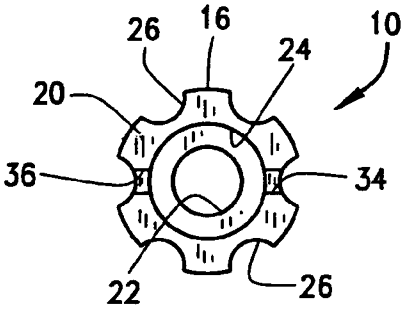
FIG. 4 is a right end elevational view of the tool of FIG. 1.
Figure 8:
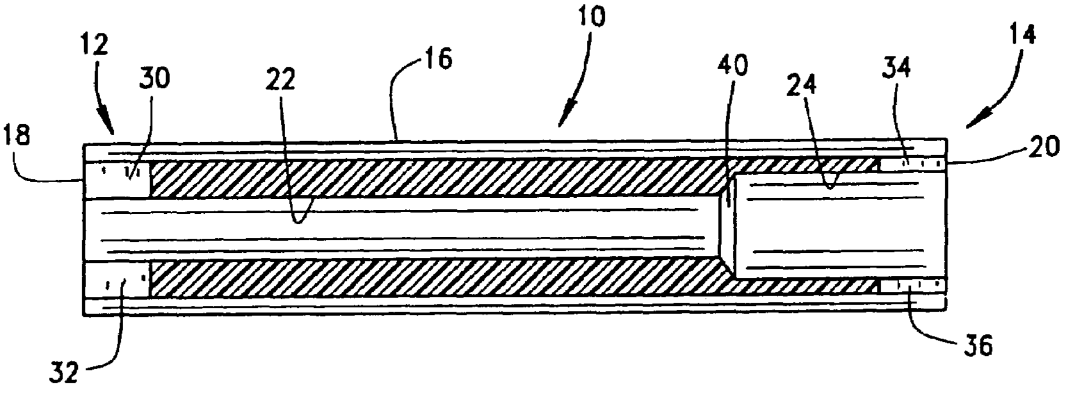
FIG. 8 is a sectional view of the tool taken along the plane of line 8-8 in FIG. 3.
Figure 9:
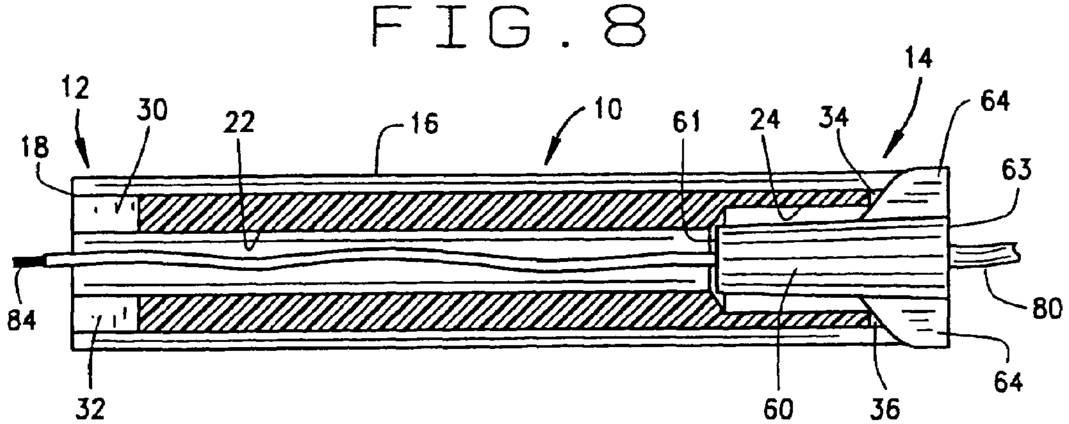
FIG. 9 is a sectional view similar to FIG. 8 showing the wire connector fastening tool holding a wingnut-type wire connector in one end with a pigtail or wire extension passing through the internal axial bore of the tool.

As shown in FIGS. 1, 3, 4, 8 and 9, a first section of the body adjacent the first end 14 includes a first axial bore 22 with a first inside diameter. As shown in FIGS. 4, 8 and 9, a second section of the body adjacent the second end 16 includes a second axial bore 24 with a second inside diameter. As best shown in FIGS. 8 and 9, the first axial bore 22 preferably extends from the first end 12 of the body to a point between the first and second ends 12 and 14 of the body, and the second axial bore 24 preferably extends from the first axial bore 22 to the second end 16 of the body. More preferably, the first axial bore 22 preferably extends from the first end surface 18 to a point between the first and second ends 12 and 14 of the body, and the second axial bore 24 preferably extends from the first axial bore 22 to the second end surface 20. Thus, as shown in FIGS. 4, 8 and 9, the first and second axial bores 22 and 24 are in communication with one another to define an internal passage that extends all of the way through the body from the first end 12 to the second end 14 and, more preferably, from the first end surface 18 to the second end surface 20.

As shown in FIGS. 4, 8 and 9, the inside diameter of the second axial bore 24 is larger than the inside diameter of the first axial bore 22. As explained below more fully, the first end 12 of the body is adapted to receive a portion of a wire connector (such as those illustrated in FIGS. 5-7) with an outside diameter less than or equal to the inside diameter of the first axial bore 22. The first end 12 of the body is adapted to frictionally engage with at least a portion of a wire connector received in the first axial bore 22 in a manner so that rotation of the tool 10 about an axis co-linear with the axial bores 22 and 24 causes rotation of wire connector received in the first axial bore 22. Similarly, the second end 14 of the body is adapted to receive a portion of a larger wire connector with an outside diameter less than or equal to the inside diameter of the second axial bore 24. The second end 14 of the body is adapted to frictionally engage with at least a portion of the larger wire connector received in the second axial bore 24 in a manner so that rotation of the tool 10 about an axis co-linear with the axial bores 22 and 24 causes rotation of wire connector received in the second axial bore 24.

As shown in FIGS. 1 and 3, the first end 12 of the body preferably has at least two notches 30 and 32 extending radially outwardly from the first axial bore 22 toward the outer surface 16 of the body. As shown in FIGS. 1 and 2, the notches 30 and 32 preferably intersect the first end surface 18 and, thus, open axially outwardly from the first end 12 of the body. Similarly, as shown in FIG. 4, the second end 14 of the body preferably has at least two notches 34 and 36 that extending radially outwardly from the second axial bore 24 toward the outer surface 16 of the body and, as shown in FIGS. 1 and 2, the notches 34 and 36 preferably intersect the second end surface 20 and open axially outwardly from the second end 14 of the body. As explained below, the notches 30, 32, 34 and 36 are adapted to receive and engage the wings of a wingnut-type wire connector in a manner so that rotation of the tool causes rotation of a wire connector received in one of the first and second ends 12 and 14.

As best shown in FIGS. 1, 3 and 4, the outer hand-engaging surface 16 of the tool 10 includes a plurality of circumferentially-spaced, longitudinal recesses or "flutes" 26, which are intended to enhance a user's grip of the tool 10 during use of the tool 10 by facilitating rotation of the tool 10 about an axis that is co-linear with the first and second internal axial bores 22 and 24. Preferably, the flutes extend all of the way from the first end 12 to the second end 14 of the body, so that the cross-sectional shape of the outer surface 16 of the body is uniform from the first end 12 of the body to the second end 14.

In the preferred embodiment, the body is of a non-conductive material, such as a polymeric material. Preferably, the entire wire connector fastening tool 10 is of a single monolithic piece of polymeric material. Also, preferably, at least a portion of the body of the tool 10 is of a substantially transparent or translucent polymeric material that permits a visual inspection of the interiors of the first and second axial bores 22 and 24 during use of the tool 10.

Figure 5:
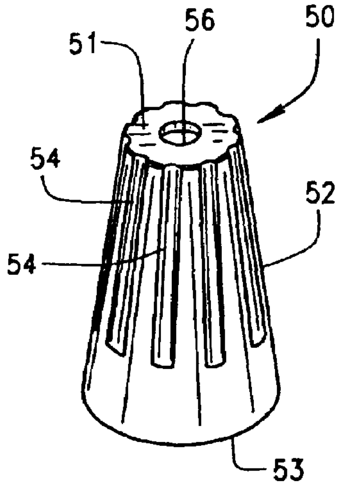
FIG. 5 PRIOR ART
FIG. 5 is a perspective view of a conventional frustoconical wire connector.

FIG. 5 is an illustration of a conventional wire connector 50 having a generally conical or frustoconical shape. The wire connector 50 has an outer cap portion of non-conductive material (e.g., plastic). The outer cap portion has a generally conical or frustoconical outer surface 52 that extends from a generally closed upper end 51 to a generally open lower end 53. The outer surface 52 includes a plurality of ribs defined by a plurality of circumferentially-spaced, longitudinal recesses 54, which facilitate manual twisting or screwing of the wire connector 50. The ribs also enhance a frictional engagement between the outer surface 52 of the wire connector 50 and the interior surfaces of the first and second axial bores 22 and 24 of the tool 10 when received therein. The wire connector 50 also includes a tapered insert (not shown) of conductive material (e.g., metal). The generally open lower end 53 permits access to the conductive insert. The conductive insert includes an internally threaded socket (not shown) adapted to receive the exposed conductive ends of two or more electrical wires that are to be conductively connected by the wire connector 50. As shown in FIG. 5, the upper end 51 of the wire connector 50 includes an aperture 56 that is adapted to receive a wire pigtail or other wire extension (e.g., a ground wire, a hot leg, or a neutral conductor). The aperture 56 allows the pigtail or extension to pass through the upper end 51 of the wire connector 50.

Figure 6:
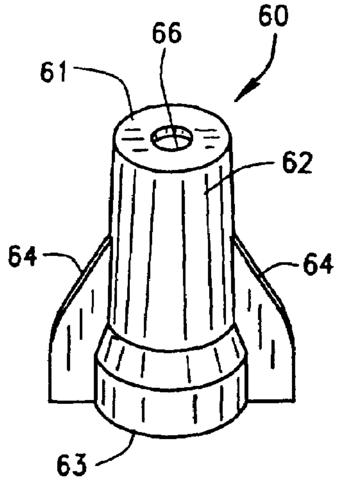
FIG. 6 PRIOR ART
FIG. 6 is a perspective view of a conventional wingnut-type wire connector.
Figure 7:
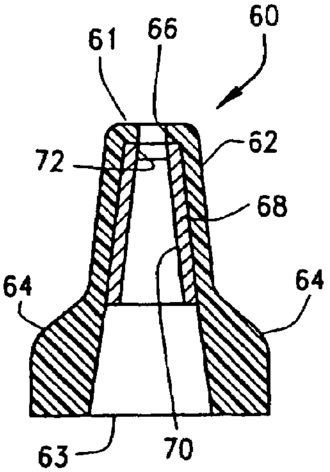
FIG. 7 PRIOR ART
FIG. 7 is a sectional view of the wingnut-type wire connector of FIG. 6.

FIGS. 6 and 7 are illustrations of a conventional wingnut-type wire connector 60 having a generally tapered body portion 62 that extends from a generally closed upper end 61 to a generally open lower end 63. A pair of outwardly extending "wings" or fins 64 are disposed on opposite sides of the body portion 62. These wings 64 facilitate manual twisting or screwing of the wire connector 60. Also, as explained below, the wings 64 are adapted to be received in the notches 30, 32, 24 and 36 of the tool 10 when the wire connector 60 is received in one of the first and second ends 12 and 14 of the tool 10 to facilitate in the rotation of the wire connector 60 by the tool 10. As shown in FIG. 7, the wire connector 60 includes a tapered insert 68 of conductive material (e.g., metal). The generally open lower end 63 permits access to the conductive insert 68. The conductive insert 68 includes a tapered socket 70, which is preferably internally threaded. The socket 70 is adapted to receive the exposed conductive ends of two or more electrical wires that are to be conductively connected by the wire connector 60. The upper end 61 of the wire connector 60 includes an aperture 66 that is adapted to receive a wire pigtail or other wire extension 84 (e.g., a ground wire, a hot leg, or a neutral conductor). The aperture 66 allows the wire pigtail or extension 84 to pass through the upper end 61 of the wire connector 60 (refer to FIG. 9 and the corresponding discussion below).

Thus, the wire connector fastening tool 10 of the present invention can be used to safely and efficiently connect a plurality of electrical wires to one another with a wire connector. In use, a portion of a wire connector (such as those illustrated in FIGS. 5-7) is inserted, closed end first, into one of the first and second ends 12 and 14 of the tool 10. Preferably, the wire connector is inserted until it fits rather snugly, to ensure an efficient frictional engagement that permits rotational movement of the tool 10 about an axis co-linear with the internal axial bores 22 and 24 to be translated into rotational movement of the wire connector. In the case of wingnut-type wire connectors, such as wire connector 60 shown in FIGS. 6 and 7, the wings 64 are received in the notches 30 and 32 of the first end 12 when the wire connector 60 is received in the first axial bore 22 or in the notches 34 and 36 of the second end 14 when the wire connector 60 is received in the second axial bore 24. The portions of the body defining the notches engage the wings 64 in a manner so that rotational movement of the tool 10 about an axis co-linear with the internal axial bores 22 and 24 is efficiently translated into rotational movement of the wire connector 60. As explained above, the inside diameters of the first and second axial bores 22 and 24 are preferably different, to accommodate wire connectors of different sizes.

FIG. 9 is a sectional view of the wire connector fastening tool 10 holding a wingnut-type wire connector 60 in the second end 14 of the tool 10. Once a portion of a wire connector is received in one of the first and second ends 12 and 14 of the tool 10 in this manner, exposed conductive ends of electrical wires 80 to be connected to one another are aligned with one another and then inserted into the open lower end 63 of the wire connector 60 and into the wire-connecting socket 70. Then, the user rotates the tool 10 about an axis that is co-linear with the internal axial bores 22 and 24, which in turn causes rotation of the wire connector 60 relative to the wires 80, until the conductive insert 68 tightly engages the conductive ends of the wires 80 to conductively connect them to one another and to secure the wire connector 60 to the wires 80. The non-conductive outer cap portion of the wire connector 60 insulates the exposed portions of the connected electrical wires 80 from contacting other wires or other conductive portions of the fixture.

As shown in FIG. 9, in the case of wire connectors having an upper end with an aperture, a wire pigtail or other wire extension 84 (e.g., a ground wire, a hot leg, or a neutral conductor) may be passed through the aperture of the wire connector, and then inserted into one or both of the first and second internal axial bores 22 and 24 of the tool 10. As explained above, the first and second internal axial bores 22 and 24 are preferably in communication with one another to define an axial bore that extends the entire length of the tool 10. Accordingly, the pigtail or extension 84 can be passed through the first and second internal axial bores 22 and 24 the entire length of the tool 10, and beyond. Because the first and second internal axial bores 22 and 24 extend the entire length of the tool 10, the tool 10 can accommodate a pigtail or extension wire 84 of any length. Thus, as shown in FIG. 9, when a wire connector is received in one of the first and second ends 12 and 14 of the tool 10, the pigtail or extension wire 84 can be passed through the aperture in the upper end of the wire connector and through the first and second axial bores 22 and 24, thereby permitting the pigtail or extension wire 84 to extend beyond the other electrical wires 80 received in the lower end of the wire connector during use of the tool 10, regardless of the length of the extension wire 84. Such pigtails and extension wires may be used for device terminations, and may be used as extensions for connecting the circuit to other circuits or electrical devices. The pigtails and extension wires may or may not be conductively connected to the other electrical wires 80 received in the lower end of the wire connector.

Because the entire body of the tool 10 is preferably of a transparent or translucent polymeric material, the user can easily see the wire connectors and wires received within the tool to ensure that they are in their proper positions during use of the tool.

A significant benefit of the wire connector fastening tool 10 of the present invention is the simplicity of its design, which results in low material and manufacturing costs. First, polymeric materials are relatively inexpensive, lightweight, easy to mold and machine, and available in transparent and translucent compositions. Second, the uniform cross-sectional shape of the body (which resembles a conventional screwdriver handle) permits extrusion of the body, if desired. Alternatively, the body could be formed in molding and/or machining processes. The body of the tool 10 can be extruded and then cut to a desired length. Because polymeric materials are so easy to machine, the first and second axial bores 22 and 24 can be formed with a drill or other conventional boring means, and the notches 30, 32, 34 and 36 can be formed with a band saw or other linear cutting tool.

Thus, a preferred method of making a wire connector fastening tool 10 of the present invention comprises the steps of: extruding or otherwise forming the elongate monolithic body; cutting the extruded body to length so that the body has a first end 12, a second end 14, and an outer surface 16 between the first and second ends; boring or otherwise forming a first internal axial bore 22 with a first inside diameter that extends from the first end 12 of the body to a point between the first and second ends of the body; boring or otherwise forming a second internal axial bore 24 with a larger second inside diameter that extends from the second end of the body 14 to the first axial bore; cutting or otherwise forming at least two notches 30 and 32 in the first end 12 of the body; and cutting or otherwise forming at least two notches 34 and 36 in the second end 14 of the body.

While the present invention has been described by reference to specific embodiments and specific uses, it should be understood that other configurations could be constructed and other uses could be made without departing from the scope of the invention as set forth in the following claims.

What is claimed is:

1. A method of making a wire connector fastening tool comprising the steps of:

providing an elongate monolithic body having a first end, a second end, and an outer surface between the first and second ends, the outer surface having an outside diameter that is generally uniform between the first and second ends of the body;

forming a first internal axial bore with a first inside diameter that extends from the first end of the body to a point between the first and second ends of the body;

forming a second internal axial bore with a second inside diameter that extends from the second end of the body to the first axial bore so that the first and second axial bores define an internal passage that extends axially through the body, the second inside diameter being larger than the first diameter;

forming at least two notches in the first end of the body that extend radially outwardly from the first axial bore toward the outer surface of the body and open axially outwardly from the first end of the body; and forming at least two notches in the second end of the body that extend radially outwardly from the second axial bore toward the outer surface of the body and open axially outwardly from the second end of the body.

2. The method of claim 1 wherein the elongate monolithic body is of a polymeric material and wherein the step of providing the elongate monolithic body comprises the steps of:

extruding the elongate monolithic body as a single piece of polymeric material; and cutting the extruded body to a desired length to define the first and second ends.

3. The method of claim 1 wherein the elongate monolithic body is of a polymeric material and wherein the step of providing the elongate monolithic body comprises the step of molding the elongate monolithic body as a single piece of polymeric material.

4. A method of manufacturing a hand tool comprising the steps of:

forming an elongate body of a single piece of polymeric material in a manner so that the body has a first end, a second end, and a generally uniform cross-sectional configuration that extends between the first and second ends of the body;

forming a first socket with a first inside diameter in the first end of the body, the first socket being configured to engage a first fastener in a manner so that rotation of the elongate body generally about an axis of the axial bore causes rotation of the first fastener; and forming a second socket with a second inside diameter that extends from the second end of the body to the first socket so that the first and second sockets define an internal passage that extends axially through the body, the second socket being configured to engage a second fastener in a manner so that rotation of the elongate body generally about an axis of the axial bore causes rotation of the second fastener, the second inside diameter being larger than the first inside diameter.

5. The method of claim 4 wherein the first fastener is a wire nut of a first size and the step of forming the first socket comprises:

forming at least two notches in the first end of the body that extend radially outwardly from the first socket toward an outer surface of the body and open axially outwardly from the first end of the body.

6. The method of claim 5 wherein the second fastener is a wire nut of a second size, the second size being different than the first size, and wherein the step of forming the second socket comprises:

forming at least two notches in the second end of the body that extend radially outwardly from the second socket toward an outer surface of the body and open axially outwardly from the second end of the body.

7. The method of claim 6 wherein the step of forming the elongate body comprises the steps of:

extruding the elongate body as a single piece of polymeric material; and cutting the extruded body to a desired length to define the first and second ends.

8. The method of claim 6 wherein the step of forming the elongate body comprises the step of molding the elongate body as a single piece of polymeric material.

9. The method of claim 4 wherein the step of forming the elongate body comprises the steps of:

extruding the elongate body as a single piece of polymeric material; and cutting the extruded body to a desired length to define the first and second ends.

10. The method of claim 4 wherein the step of forming the elongate body comprises the step of molding the elongate body as a single piece of polymeric material.

11. A method of manufacturing a hand tool comprising the steps of:

extruding an elongate monolithic body;

cutting the extruded body to a desired length, such that the body has a first end, a second end, and a generally uniform cross-sectional configuration that extends between the first and second ends of the body;

forming a first internal axial bore with a first inside diameter that extends from the first end of the body to a point between the first and second ends of the body;

forming a second internal axial bore with a second inside diameter that extends from the second end of the body to the first axial bore so that the first and second axial bores define an internal passage that extends axially through the body, the second inside diameter being larger than the first diameter; and forming at least two notches in the first end of the body that extend radially outwardly from the first internal axial bore toward an outer surface of the body and open axially outwardly from the first end of the body.

12. The method of claim 11 wherein the step of forming the first internal axial bore is performed after the step of extruding the monolithic body.

13. The method of claim 12 wherein the step of forming the first internal axial bore comprises drilling the axial bore into the body from the first end of the body.

14. The method of claim 11 wherein the step of forming the first internal axial bore comprises drilling the first internal axial bore into the body from the first end of the body, and wherein the step of forming the second internal axial bore comprises drilling the second internal axial bore into the body from the second end of the body.

15. The method of claim 11 wherein the step of extruding the elongate monolithic body includes extruding the elongate monolithic body from a polymeric material.

16. The method of claim 15 wherein the step of extruding the elongate monolithic body includes extruding the elongate monolithic body from a substantially transparent polymeric material.

17. The method of claim 11 further comprising the step of forming at least two notches in the second end of the body that extend radially outwardly from the second internal axial bore toward the outer surface of the body and open axially outwardly from the second end of the body.

* * * * *